US009967780B2

(12) United States Patent
Westphal

(10) Patent No.: US 9,967,780 B2
(45) Date of Patent: May 8, 2018

(54) END-USER CARRIED LOCATION HINT FOR CONTENT IN INFORMATION-CENTRIC NETWORKS

(71) Applicant: Futurewei Technologies, Inc., Plano, TX (US)

(72) Inventor: Cedric Westphal, San Francisco, CA (US)

(73) Assignee: Futurewei Technologies, Inc., Plano, TX (US)

( * ) Notice: Subject to any disclaimer, the term of this patent is extended or adjusted under 35 U.S.C. 154(b) by 405 days.

(21) Appl. No.: 14/147,346

(22) Filed: Jan. 3, 2014

(65) Prior Publication Data

US 2014/0189060 A1    Jul. 3, 2014

Related U.S. Application Data

(60) Provisional application No. 61/748,602, filed on Jan. 3, 2013.

(51) Int. Cl.
| | | |
|---|---|---|
| *G06F 15/16* | (2006.01) | |
| *H04W 36/00* | (2009.01) | |
| *H04W 4/02* | (2018.01) | |
| *H04W 36/02* | (2009.01) | |
| *H04L 29/08* | (2006.01) | |

(52) U.S. Cl.
CPC ....... *H04W 36/0016* (2013.01); *H04L 67/289* (2013.01); *H04L 67/327* (2013.01); *H04L 67/18* (2013.01); *H04L 67/2842* (2013.01); *H04W 4/02* (2013.01); *H04W 36/023* (2013.01)

(58) Field of Classification Search
CPC . H04W 36/0016; H04W 4/02; H04W 36/023; H04L 67/289; H04L 67/327; H04L 67/18; H04L 67/2842
USPC ........................................................ 709/217
See application file for complete search history.

(56) References Cited

U.S. PATENT DOCUMENTS

| | | | | |
|---|---|---|---|---|
| 7,463,591 B1 * | 12/2008 | Kompella | ........... | H04L 12/2697 370/225 |
| 2005/0108287 A1 * | 5/2005 | Tanabe et al. | ............. | 707/104.1 |
| 2005/0125626 A1 | 6/2005 | Todd | | |
| 2005/0125627 A1 * | 6/2005 | Kilian et al. | .................. | 711/202 |
| 2005/0128969 A1 * | 6/2005 | Lee | ........................ | H04W 36/32 370/313 |

(Continued)

OTHER PUBLICATIONS

Proxy-assisted Content Sharing Using Content Centric Networking (CCN) for Resource-limited Mobile Consumer Devices (IEEE Jun. 27, 2011) by Jihoon Lee and Daeyoub Kim; p. 481 section D.2.*

(Continued)

*Primary Examiner* — John MacIlwinen
*Assistant Examiner* — Tan Doan
(74) *Attorney, Agent, or Firm* — Conley Rose, P.C.

(57) ABSTRACT

A method implemented by a network node coupled to a network, the method comprising inserting a location hint in a request for a content, wherein the location hint specifies one or more network locations that are known by the network node to hold at least part of the content, sending the request to the network, wherein the request comprises a content name that describes the content, and receiving a data message corresponding to the request from the network, wherein the data message comprises at least a portion of the content.

20 Claims, 6 Drawing Sheets

(56) References Cited

U.S. PATENT DOCUMENTS

| | | | | |
|---|---|---|---|---|
| 2006/0117093 | A1* | 6/2006 | Aviani, Jr. | H04L 29/06 709/217 |
| 2009/0327345 | A1 | 12/2009 | Torr | |
| 2011/0161346 | A1 | 6/2011 | Solihin | |
| 2011/0265174 | A1* | 10/2011 | Thornton | H04L 67/327 726/15 |
| 2012/0136945 | A1 | 5/2012 | Lee et al. | |
| 2012/0254432 | A1* | 10/2012 | Roseborough et al. | 709/226 |
| 2012/0311079 | A1* | 12/2012 | Bae et al. | 709/217 |
| 2013/0086142 | A1* | 4/2013 | Hampel | H04L 67/148 709/203 |
| 2013/0329696 | A1* | 12/2013 | Xu et al. | 370/331 |

OTHER PUBLICATIONS

Rosensweig, E.J., et al., "Breadcrumbs: efficient, best-effort content location in cache networks", IEEE Communications Society, IEEE INFOCOM 2009 Proceedings, pp. 2631-2635.

Westphal, C., "CacheMule: a Mobile-Carried Content Location Mechanism", IFIP/IEEE International Symposium on Integrated Network Management, May 27-31, 2013, Ghent, Belgium, 4 pgs.

Jacobson, V., et al., "Custodian-Based Information Sharing", IEEE Communications Magazine, Information-Centric Networking, Jul. 2012, pp. 38-43.

Diallo, M., et al., "Towards Extreme Scale Content-Based Networking for the Next Generation Internet", IEICE Trans. Commun., vol. E94-B, No. 10, Oct. 2011, The Institute of Electronics, Information and Communication Engineers, pp. 2706-2714.

Peterson, L., et al., "Framework for CDN Interconnection draft-ietf-cdni-framework-07", Network Working Group, 3466, Nov. 25, 2013, 52 pgs.

Popa, L., et al., "HTTP as the Narrow Waist of the Future Internet", Hotnets '10, Oct. 20-21, 2010, Monterey, CA, USA, 6 pgs.

Jacobson, V., et al., "Networking Named Content", CoNEXT'09, Dec. 1-4, 2009, Rome, Italy, 12 pgs.

Dannewitz, C., "NetInf: An Information-Centric Design for the Future Internet", European Community's Seventh Framework Programme, Agreement No. 216041, 3 pgs.

Levin, D., et al., "Logically Centralized? State Distribution Tradeoffs in Software Defined Networks", HotSDN'12, Aug. 13, 2012, Helsinki, Finland, 6 pgs.

Michel, S., et al., "Adaptive web caching: towards a new global caching architecture", Elsevier Science B.V., 1998, 9 pgs.

Montpetit, M.-J., et al., "Network Coding Meets Information-Centric Networking: An Architectural Case for Information Dispersion Through Native Network Coding", NoM'12, Jun. 11, 2012, Hilton Head, South Carolina, USA, pp. 31-36.

Xie, H., et al., "Scale Content Centric Networks via Reactive Routing", IEEE ICC 2013—Next-Generation Networking Symposium, pp. 3530-3535.

Fan, L., et al., "Summary Cache: A Scalable Wide-Area Web Cache Sharing Protocol", IEEE/ACM Transactions on Networking, vol. 8, No. 3, Jun. 2000, pp. 281-293.

Ahlgren, B., et al., "A Survey of Information-Centric Networking", IEEE Communications Magazine, Information-Centric Networking, Jul. 2012, pp. 26-36.

Westphal, C., "On Maximizing the Lifetime of Distributed Information in Ad-Hoc Networks With Individual Constraints", MobiHoc '05, May 25-27, 2005, Urbana-Champaign, Illinois, USA, pp. 26-33.

Westphal, C., et al., "An Epidemiological Study of Information Dissemination in Mobile Networks.", IEEE Communications Study, IEEE Secon 2009 proceedings, 9 pgs.

Westphal, C., "Synchronizing State with Strong Similarity Between Local and Remote Systems", MCS'12, Jun. 25, 2012, Low Wood Bay, Lake District, United Kingdom, pp. 15-20.

Foreign Communication From a Counterpart Application, PCT Application No. PCT/US2014/010220, International Search Report dated Apr. 8, 2014, 6 pages.

Foreign Communication From a Counterpart Application, PCT Application No. PCT/US2014/010220, Written Opinion dated Apr. 8, 2014, 6 pages.

* cited by examiner

END-USER CARRIED LOCATION HINT FOR CONTENT IN INFORMATION-CENTRIC NETWORKS

CROSS-REFERENCE TO RELATED APPLICATIONS

The present application claims priority to U.S. Provisional Patent Application No. 61/748,602 filed Jan. 3, 2013 by Cedric Westphal and entitled "An End-User Carried Location Hint for Content in Information-Centric Networks", which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Content Centric Networking (CCN) is a network model or architecture in which the focus is on locating and providing content or data to users rather than on having the users reference a specific physical location where that data is to be retrieved from. For example, in CCN-based communication, content requests may bind to a network layer over named content object and de-couple location and address information, which may eliminate the need for pre-binding.

CCN allows intermediate routers to store data. As a result, a file carrying a piece of content may be stored in multiple locations including a publisher's server and cache locations. An advantage of caching content is that it may allow subsequent users or consumers of the same file to obtain the content locally without having to fetch the content from the publisher's server every time. Caching may reduce the workload on the publisher's server (or content distribution network (CDN) servers when the publisher has delegated the content to the CDN). Further, caching may reduce network traffic outside of the network's operators, and thereby reduce end-to-end delay for content consumption.

While there are beneficial aspects brought by CCN, taking advantage of a content that has been cached in a network or network domain involves locating one or more copies of the content. For example, using existing technologies, the content may be located in an opportunistic manner, that is, by "running" into a copy of the content on the way to a publisher's server or a CDN server. This may also require updating content routing tables in routers or switches so that they are able to direct requests for the content to a nearest copy. However, the complexity and scale of updating routing tables for a large amount of contents may be prohibitive in practice. For instance, the current Internet is believed to hold about 10^15 pieces of content, which is constantly growing. Aggregating contents by name may allow routing on (name) prefixes, but routing a content or data to its nearest copy may run counter to aggregation, as the routing may detach specific items from their default routing prefix.

SUMMARY

In one embodiment, the disclosure includes a method implemented by a network node coupled to a network, the method comprising inserting a location hint in a request for a content, wherein the location hint specifies one or more network locations that are known by the network node to hold at least part of the content, sending the request to the network, wherein the request comprises a content name that describes the content, and receiving a data message corresponding to the request from the network, wherein the data message comprises at least a portion of the content.

In another embodiment, the disclosure includes an apparatus comprising a processor configured to insert a probe flag in a request for a content, wherein the request comprises a content name that describes the requested content, and wherein the probe flag is inserted to test one or more network locations that are known by the processor to hold at least part of the requested content, a transmitter coupled to the processor and configured to transmit the request to a network node, and a receiver coupled to the processor and configured to receive a data message corresponding to the request from the network node.

In yet another embodiment, the disclosure includes a method implemented by a network router, the method comprising receiving a content request from an end device, wherein the content request comprises a content name and a location hint, wherein the content name describes a requested content, and wherein the location hint specifies a list of network locations each known by the end device to hold at least part of the requested content, determining, based at least in part on the location hint, a network location from where at least a portion of the requested content is to be retrieved, and forwarding at least the portion of the requested content from the network location to the end device.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
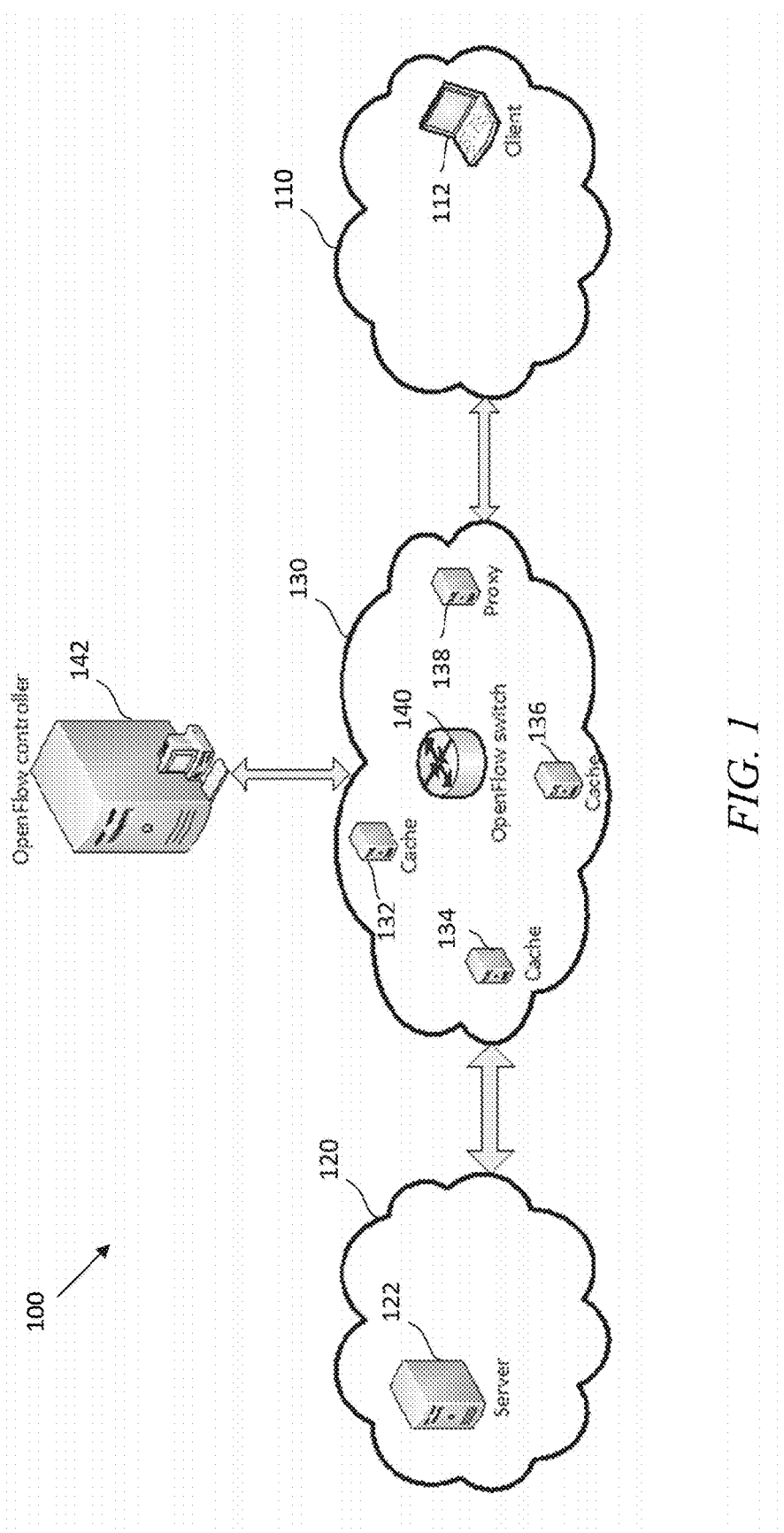
FIG. 1 is a schematic diagram showing an end-to-end view of an embodiment of a network model.

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

It may be possible for a network domain to record and keep track of which content is stored where within administrative boundaries of the domain. However, exchanging the content location information across multiple network domains may require synchronization protocols, which may require a high overhead cost in order to provide strong consistency in routing tables across domains. The issue of consistency in routing tables needs to be addressed, and there may exist a tradeoff between routing performance and the rate of synchronization between different systems.

To reduce the scope of searching for contents and make content resolution more scalable, it may also be possible to place contents over a restricted subset of a network topology. However, the restriction goes against the principle of a CCN architecture, where contents may be located potentially anywhere. For example, if the subset is too limited in scale, it may be prone to introducing points of failure.

Various consequences may thus arise. Firstly, knowledge of the location of a piece of content (other than its default location at the publisher's server) may be relatively precious for the consumer of such content. Due to the huge amount of contents (e.g., about $10^{15}$ currently), unless a routing mechanism is able to dynamically update in real-time a list of $10^{15}$ items, locating a cached copy of the content in a network may be difficult. Secondly, an end user or a content consumer may need a mechanism to request and obtain the location of a content rather than the content itself.

The mobility of a network node, such as a smartphone or a tablet, may sometimes disconnect a content consumer from a content copy that is being downloaded, streamed, or used in other ways. Even in the case of a static node, such as a desktop computer or smart television, the content consumer may be connected through several interfaces over different networks, which may have different views of where copies of a content are located.

Currently, there may lack a reliable debugging functionality in CCN-based networks. For instance, to test whether a path from an end host to a content copy is valid, the network may need to actually download the content. Although a network administration tool known as "Ping" has been widely used for small scale network debugging, e.g., to test if a host in an Internet Protocol (IP) network is up and running, CCN lacks a reliable equivalent of "Ping". For another instance, existing solutions may let a network resolve the content to a location, during which the network may implicitly assume either perfect knowledge of the locations of all content copies, or may use a default route to an original content producer server (e.g., publisher or CDN server).

In use, content routing at a network layer may lead to a significant increase in routing table sizes (e.g., there may be currently only about 400,000 IP prefixes with Border Gateway Protocol (BGP) for $10^{15}$ pieces of content) and in communication protocols required to update the content routing tables. One practical solution may be to map contents to their original servers, as is done today. However, this solution fails to take advantage of multiple content copies that may be stored elsewhere. Another solution may be to have a content routing protocol know all copies of a content at any given time, which may involve tracking a very large amount of data that may evolve constantly. For example, some contents or data are not static and may be cached for short periods of time.

The present disclosure teaches embodiments to address aforementioned issues by enabling a CCN to effectively and efficiently locate contents and provide the contents to end users or consumers. Specifically, instead of solely relying on a network to determine an optimal retrieval source for a content, an end device may actively assist location determination. While the network may have a final decision on where to get the content from, the end device may assist the network by providing potential locations that are known or believed by the end device to hold cached copies of the content. Further, this disclosure offers new functionality into a network, e.g., inserting a probe flag to a content request to test a route to a copy of the content at a network location before actually retrieving the content from the network location.

In this disclosure, the abstractions that may be needed in a CCN are considered. The usual publish and subscribe primitives may be extended with some content location additions. Indeed, one of the main challenges of CCN may be to keep the content routing consistent, and this may be eased by offering content location support in the protocol to get and push data. At least two primitives are disclosed herein. In addition to the basic push/pull primitives that exist in most CCN architectures, a content location message that requests not the content, but its availability, and a content hint message that lets the consumer specifies where to find the content to the network are described. Both may help coping with the uncertainty of a content location that may come from the huge scale and the highly dynamic nature of content routing tables. Various modes including location hint mode, probe only mode, and listed location mode may be used in the disclosed embodiments.

FIG. 1 is a schematic diagram showing an end-to-end view of an embodiment of a network model 100, which may comprise one or more network domains. For example, the network model 100 as portrayed in FIG. 1 comprises a client network 110, a content provider network 120, and an intermediate network 130 therebetween. One or more end devices or clients (e.g., a client 112) may be located in the client network 110, and one or more servers (e.g., a server 122) may be located in the content provider network 120. The network 130 connects the client network 110 and the content provider network 120. Note that although portrayed as residing in different networks or domains, depending on the implementation, the client 112, the server 122, and their intermediate network nodes may be located in the same network or network domain.

The network 130 may be a CCN-based network. Depending on the context, CCN may sometimes be referred to as named data networking (NDN), content-based networking, data-oriented networking, or information-centric networking (ICN), or other similar terms. In an embodiment, the CCN-based network may be implemented as a software defined network (SDN), e.g., using OpenFlow as communication protocol. In this case, the major components of the network 130 may comprise one or more caching elements (e.g., caches 132, 134, and 136), one or more proxy elements (e.g., a proxy 138), one or more switches (e.g., an OpenFlow switch 140), and at least one controller (e.g., an OpenFlow controller 142). The controller 142 may be configured to run a module which controls all other network elements. The proxy 138 and the caches 132-136 may communicate with the controller 142, thus the proxy 138 and the caches 132-136 may be considered as non-forwarding OpenFlow elements.

The network 130 may be controlled by the controller 142 (without loss of generality, only one controller 142 is illustrated for the network 130). The controller 142 may run a content management layer (within a control plane) that manages content names (e.g., in the form of file names), translates them to routable addresses, and manages caching policies and traffic engineering. For example, the control plane may translate information on the content layer to flow rules, which may then be pushed down to switches including the switch 140. Some or all switches in the network 130 may have ability to parse content metadata from packets and pass the content metadata on to the content management layer in the controller 142.

From the perspective of a network operator, assume that a content is requested by the client 112 from the server 122, both of which can be outside of the network 130. In an embodiment, the network 130 may operate with a control plane which manages content. Namely, when a request for a content (in short as content request) from the client 112 arrives in the network 130, the control plane may locate a proper copy of the content (internally in a cache (e.g., cache 132), or externally from its origin server 122). Further, when content objects from the server 122 arrive in the network 130, the control plane may have the ability to route the content and fork the content flow towards a cache (on the path or off the path). Further, the control plane may leverage CCN semantics, such as interest and data packets, to identify content. Alternatively, the control plane may be built upon existing networks, e.g., using SDN concepts. This disclosure may work in either context, but is described herein mostly as built upon SDN, so that legacy clients and legacy servers may be integrated with the network 130.

The content provider network 120 may connect to the network 130 using one or more designated ingress switches. The disclosed implementation may not require any modification to the client network 110 or the content provider network 120. The network 130 may be implemented as a content distribution network (CDN) that can be plugged into an existing networking infrastructure. For instance, the network 130 may be plugged in between and connect to each of them over some tunneling protocol. The network 130 may decrease the latency of content access while making network management relatively easy and seamless.

When the client 112 wishes to connect to the server 122 (e.g., a content server from which contents are served or originated) by sending a packet comprising a request for content, an ingress OpenFlow switch (e.g., the switch 140) may forward the packet to the controller 142. The controller 142 may write flows to divert Transmission Control Protocol (TCP) connections from the client 112 to the proxy 138. The proxy 138 may parse the client's request to check if the content is cached somewhere in the network 130. If the content is not cached in the network 130, the proxy 138 may inform the controller 142, which may then select a cache to store the content, e.g., by writing flows to divert a copy of the content from the server 122 to the cache. In each step, the controller 142 may maintain a global state of all caches in the network 130, e.g., which cache stores a specified content.

In use, when a piece of previously cached and indexed content is requested, the content may be served back from the cache (e.g., the cache 132) instead of the server 122. The proxy 138 (or another proxy not shown in FIG. 1), which may be transparent to the client 112, may be used to multiplex between the server 122 and the cache 132. When the controller 142 sees that the client 112 is requesting content from the server 122, the controller 142 may redirect the flow to the proxy 138 and assign a port number. Thus, the controller 142 may know the mapping between port numbers on the proxy 138, between the source port and the source IP address, and between the destination port and the destination IP address. When the server 122 in a cache miss case (or the cache 132 in a cache hit case) sends back a data flow carrying the content, the data flow may be mapped back to the original server 122 using the information stored in the controller 142.

The caches 132-136 may be placed in the network 130 which is controlled by the controller 142. Once a content has been identified, the controller 142 may decide to cache the content. Specifically, the controller 142 may select a cache (assume the cache 132), write appropriate flows to re-direct a copy of the content towards the cache 132, record location of the cache 132 as the location of the content. In content service, when the controller 142 sees a new request for the same content, the controller 142 may redirect the new request to the cache 132 where the controller 142 stored the content. Obtaining the content from the cache 132 instead of the server 122 may result in decreased access latency, since the cache 132 may be geographically closer to the client 112 than the server 122. Further, since there is no need to get the content from the server 122 each time, network bandwidth between the cache 132 and the server 122 may be saved, improving overall network efficiency.

In an embodiment, a method or approach denoted as CacheMule may be used to expand primitives exposed by an ICN to assist identifying a content location using a location probing mechanism. The mechanism may help the network to select proper interfaces for getting the content and may help debugging. For this reason, the probing mechanism may be viewed as a content-centric version of "Ping". Further, CacheMule may also be used to attach a known location of the content as an attribute of the content request as an indication for the network to retrieve the content, which may assist session continuity in a mobile environment.

A CCN may store a content and allow routing by a name of the content rather than a specific location of the content. Examples of such networks include those known as NETINF, PURSUIT, and so forth. This may create a content routing structure at the router which contains either a path to the content in the case of a content forwarding information base (FIB), or a copy of the content in the case of a cache or a content store. The present disclosure may mostly use CCN architecture as an example, however, it should be understood that the basic principles disclosed herein may be applicable to other network architectures. Within this context, the disclosed solutions may be an extension of interest semantics. The disclosed solutions may not need a new control plane, and may be forwarded in-band.

In this disclosure, a content may be mapped to a location by assigning a prefix to a specific location (e.g., assigning a globally unique identifier to each potential cache with proper NDN/CCN naming semantics) and appending a content name to the cache identifier. For instance, a content file with a name www.foo.com/videos/cat.mp4 may be copied at a cache with a network location or address denoted as xyz as: xyz/www.foo.com/videos/cat.mp4. In this case, the only routing that may be necessary is to xyz, as a prefix for the full name is sufficient to locate the content. As such, the prefix xyz becomes the location of the content, and may allow one to make the distinction between the content name and its location. The prefix xyz may need to be routable in the network, and a cost metric may be associated with this prefix, as with other prefixes in the routing table.

Figure 2:
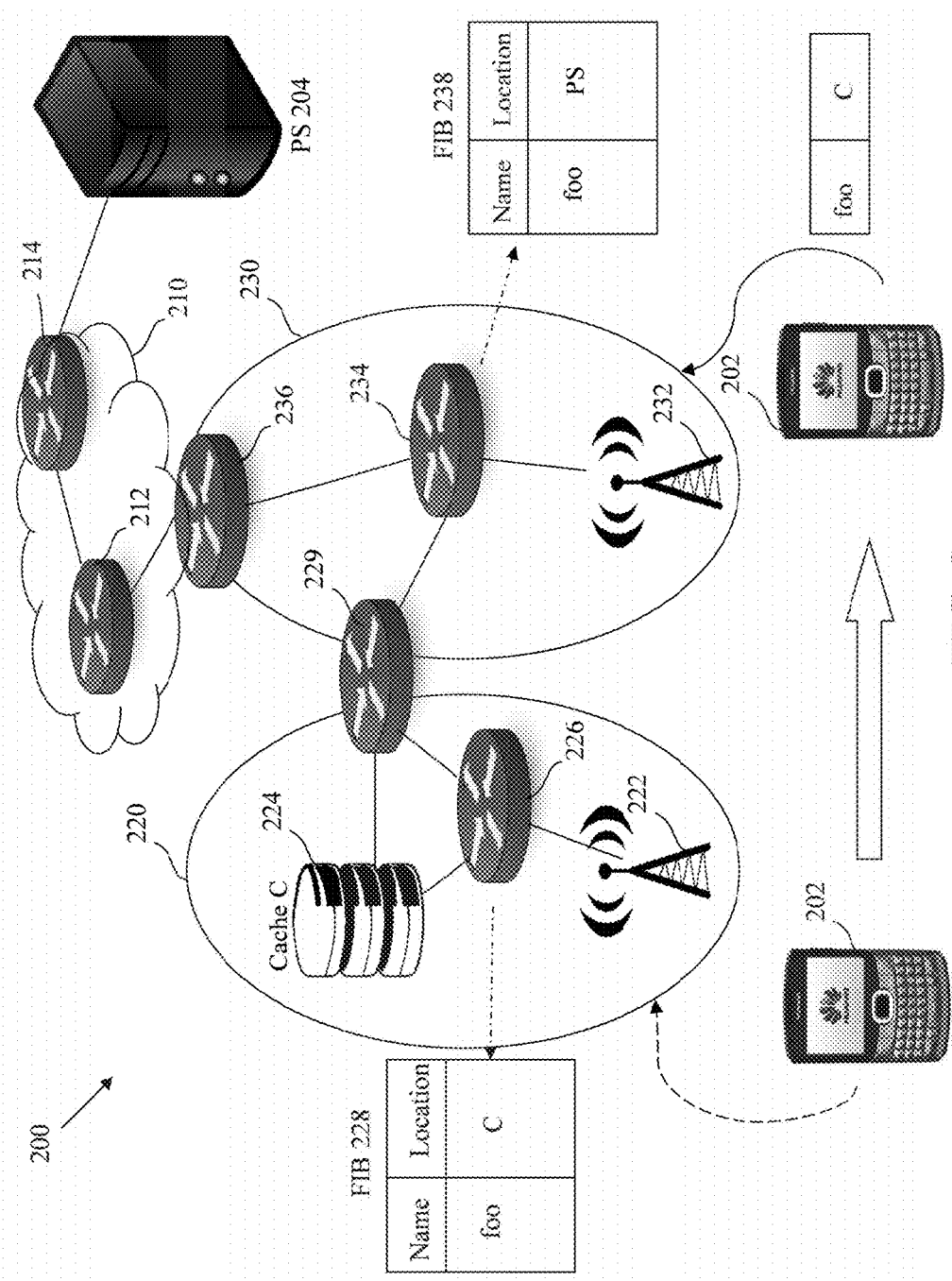
FIG. 2 is a schematic diagram of an embodiment of a content centric networking (CCN)-based network.

FIG. 2 is a schematic diagram of an embodiment of a CCN-based network 200. The network 200 comprises a network domain 210, an autonomous system (AS) 220, and an AS 230. A mobile node 202 may be a wireless node attached to the network 200 through an access point. The mobile node 202 may be any user end device such as a smartphone, a wearable device (e.g., smart glasses or smart watch), a tablet, an auto system, etc. The access point may be any suitable network device, such as a wireless fidelity (WiFi) router or a base station, that connects the mobile node 202 to the network 200. Note that, although a mobile node is used as an example, disclosed principles may similarly apply to other types of end devices that may couple to the network 200 either wirelessly or wired. In the network 200, the mobile node 202 may not need to configure a network address, and the mobile node 202 may use multiple interfaces. Therefore, it is possible that the mobile node 202 may neither know which attachment or access point (AP) the mobile node 202 is connected to, nor which corresponding node or nodes are sending content to the mobile node 202.

In practice, since a content usage patterns of an end user may be self-correlated, a user of content may be more likely to have accessed this content in the past. Thus, the end user may help speed up the resolution of the content location by sharing his usage history with the network. FIG. 2 assumes that the mobile node 202 is originally coupled to the AS 220 via an access point 222 (shown as a base station but may take any suitable form). The mobile node 202 has accessed a content with an examplary name dubbed as foo, which is stored in a cache 224 (denoted as C). An intermediate router 226 connects the cache 224 and the access point 222. In use, to make the content accessible to clients such as the mobile node 202, an FIB 228 may be stored in the router 226 to map content names to content locations. In this case, the content name foo is mapped to the content location C.

Further, FIG. 2 assumes that, while accessing the content stored in the cache 224, the mobile node 202 switches or migrates from the AS 220 to the AS 230 (e.g., the mobile node 202 is switching from a wireless long time evolution (LTE) network to a WiFi network or roaming to another wireless network). In this case, the AS 220 may be referred to as a previous AS, and the AS 220 as a next AS. Since there is no cached copy of the content in the AS 230, the mobile node 202 may retrieve the content from a publisher server (PS) 204. To make contents stored in the PS 204 accessible to clients such as the mobile node 202, an FIB 238 may be stored in the router 234 to map content names to content locations. In this case, the same content name foo is mapped to the content location denoted as PS.

The PS 204 may be located in or be coupled to the network domain 210, which comprises routers 212 and 214. The AS 220 and AS 230 may be implemented as any suitable type of network domains and may be interconnected via an edge router 229. The AS 230 may comprise an access point 232, an intermediate router 234, and an edge router 236 that interconnects the network domain 210.

In practice, the PS 204 holding the original copy of a content may not be the optimal retrieval source compared to caches. A content file (or an exchange) may often comprise multiple chunks or segments, in which case several round trips may complete a transaction, that is, downloading a file or completing some service. As information regarding a cache location may be valuable, a location hint may be included in requests for the subsequent segments of a file, in order to assist a routing layer in resolving the content location. The network 200 may be able to resolve a content name, either through an explicit name resolution infrastructure, or by hop-by-hop (name-based) routing to the content.

In an embodiment, instead of solely relying on the AS 230 to determine an optimal location to retrieve the content, the mobile node 202 may provide a list of potential content locations to the AS 230. Specifically, when the mobile node 202 sends a request for content to the access point 232, the mobile node 202 may insert a location hint in the request, wherein the location hint specifies one or more network locations that are known by the mobile node 202 to hold at least part of the content. As shown in FIG. 2, the mobile node insert the location hint identifying the cache 224 (Cache C) in a request for the content foo.

The location hint, in turn, may be received by the access point 232 and forwarded to the router 234. Upon receiving the request with the location hint, the router 234 may determine, based at least in part on the location hint, a network location from where at least a portion of the requested content is to be retrieved. For example, the router 234 may determine whether to retrieve the content foo from the PS 204, or the cache 224, or different chunks of the content from both locations. Various criteria may be used for the determination, such as the reachability of the cache 224 from the router 234, the cost of routing from cache 224 to router 234, the processing time to resolve the location of PS 204 from the content name, and comparative cost of routing from the PS 204 to the router 234. For instance, as the PS 204 is shown to be four hops away from the router 234, while the cache 224 is shown be two hops away from the router 234, conceivably the router 234 may elect to retrieve the content from the cache 224 instead of the PS 204.

The use of location hint in a content request described above with respect to FIG. 2 may be referred to as a location hint mode. Absent the location hint, the network 200 may behave as follows: the mobile node (MN) 202 may access an object from a local cache (LC) 224. The MN may change access points, may leave the previous access router (PAR) 226, and may connect to a new access router (NAR) 234. In order to retrieve the next segment of the object, the MN 202 may issue a primitive denoted as GET(name) for the next segment. The NAR 234 may need to: 1) resolve the name into a location; and 2) fetch the object from the resolved location. As discussed earlier, considering the sheer volume of contents available on the Internet, it may not be expected that a network such as the AS 230 has the capability to know the location of every copy of an object or content that may be accessed by a mobile node. Thus, the location that the NAR 234 may be expected to know may be the object's original location (OL) at the PS 204. Consequently, the routing path may be switched from MN-PAR-LC to MN-NAR-OL. Since the PS 204 may be further away from the MN 202 compared to the LC 224, performance degradation may be substantial.

Using the location hint mode, a content request formed using GET(name;LC) and carrying the location of the LC 224 may be sent out by the MN 202. The NAR 234 may then make a decision regarding where to retrieve the content. The NAR 234 may also send a GET(name;location;P) probe where location may be any potential content location, including OL 204 and LC 224 to essentially Ping the content. Based upon the response to a probe packet, the NAR 234 may then make a routing decision to retrieve the content.

The NAR 234 may also decide to bicast traffics to both the LC 224 and the OL 204 to assess the liveliness of each path and empirically compare. This may achieve the fastest handoff recovery, since it may place known copies of the content (at LC 224 and OL 204) in competition with each other. Note that to make these two requests work cooperatively and not competitively, network coding may be used. For instance, different segments or chunks of content may be retrieved from each source, and combined by the NAR 234 to feed back to the MN 202.

The MN 202 knowing explicitly where the content is located may be advantageous, as the location information may allow the MN 202 to inform the NAR 234 of where to lookup the content. Some network architectures such as NDN may not consider content location. Thus, NDN may not take advantage of copies that are known by some parts of the network, but unknown by other parts.

As described above, content routing in CCN may need a different network debugging tool compared to traditional IP networks. One can assess the liveliness of CCN links on a link-by-link basis. Thus, each router or switch may ensure that the interfaces it is connected by is live or active, that is, up and running. For multi-link paths, there may be no systematic tools to debug. In particular, since the location of a content may evolve in time, there may lack predictability of the path taken by a packet. To demonstrate this scenario, suppose that an end user node is downloading a piece of content from a Server A, and one of the intermediate routers stops functioning properly. In this case, an CCN protocol may find another copy of the content, e.g., from another Server B. Thus, a network administrator managing the network may not immediately notice the failure of the intermediate router. Current technologies may lack ability to test a specific path in an ICN.

As mentioned above, it may be difficult to dynamically locate contents when 10^15 pieces of content may be globally addressable and be stored in multiple, time varying locations in a network. The issue of locating contents may be alleviated as, according to an embodiment, once an end user node (potentially mobile) resolves a potential location of a content, the end user node may share this location information with its next networks of attachment. An in-band mechanism may be used to locate content without triggering a data transfer, which may be useful for, among other uses, network debugging.

A content consumer using a user device may request data using a GET(name) primitive, for instance, by sending an interest packet. In return, the user device may receive the requested content, using a SEND or a PUT primitive, e.g., a data packet in CCN. In an embodiment, an extension to this primitive may be used to add a location hint as a parameter of the GET primitive. The primitive may thus become GET(name; location hints), where the name describes the requested object, and location hints may be a list of known network locations that hold this object. In return for a content request (e.g., an interest or a subscribe message in a pub/sub infrastructure), a network may respond with a SEND(name, location) message which may comprise the requested content (or at least a portion part of the content if the data is segmented over several chunks and/or stored in multiple locations).

Figure 3:
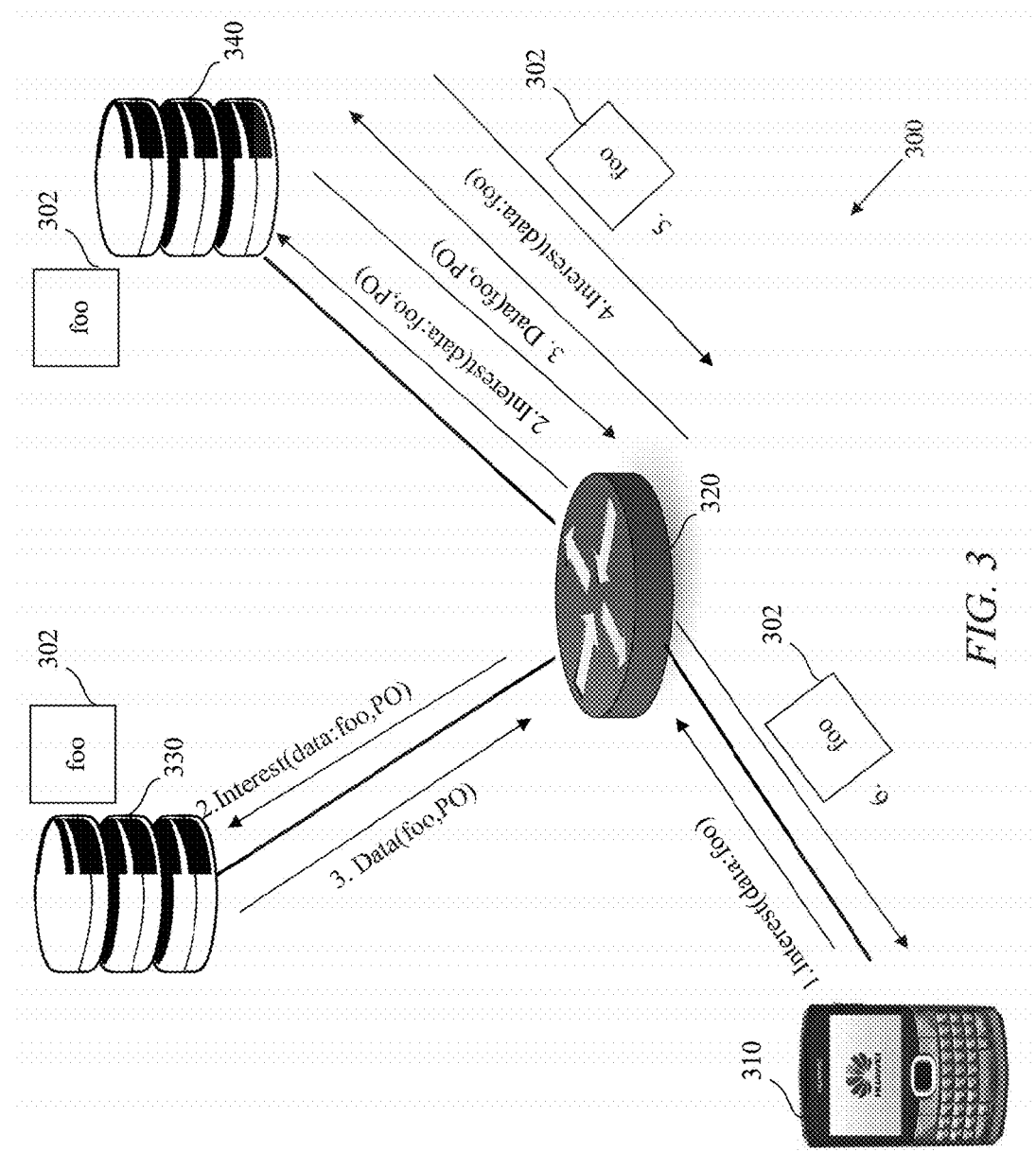
FIG. 3 is a schematic diagram of an embodiment of a probe only (PO) mode.

In another embodiment, this disclosure may expand the GET primitive to support a probe-only (PO) mode, which may be used to test the liveliness of a path involving one or more links. The PO mode may use a specific type of packet which intends to test network capability without adding undue overhead by having the network send traffic that consumes network resources. FIG. 3 is a schematic diagram of an embodiment of a PO mode 300, which involves a mobile node 310, an intermediate router 320, a first network location 330, and a second network location 340. The network locations 330 and 340 may be two caches or a cache and a PS holding at least part of the same content 302 (dubbed as foo).

In the PO mode 300, the mobile node 310 may send a request for the content 302 to the router 320. The request may comprise an interest packet that in its header specifies a name that describes the requested content (shown as step 1 in FIG. 3). The request may further comprise a probe flag, e.g., as an option in the parameters of the GET(.) function. Upon receiving a request for content with the PO flag, the intermediate router 320, which may be a router that cannot answer with requested content, may forward the packet according to the route resolution performed using a name of the requested content. Note that the router 320 may also insert a location hint or probe flag into a content request, and forward such request to an end point which may be one or both of the network locations 330 and 340. Shown as step 2 in FIG. 3, interest packets in the form of Interest(data:foo, PO) are sent to both the network locations 330 and 340.

An end point (e.g., a router that can answer with the requested content) may respond to the request with an empty file and its own location. The response may be formed using the SEND(.) primitive. Shown as step 3 in FIG. 3, data messages denoted as (foo, PO) are sent from both the network locations 330 and 340 to indicate that both locations hold at least part of the content 302. To respond, the end points may need to hold the data (in case the content is requested later), but may not need to send it right away in step 3.

The SEND(.) primitive may be extended with its PO mode as well. In this case, an end point node which responds to a GET request may set a probe flag, which may include a content name, information included in the GET request (depending on the ICN architecture, the information may include a nonce to identify the GET request and other parameters), its own location, but may not need to include any portion of the requested content.

In an embodiment, the sending of the content request may ask for a signature of the content to be forwarded back to ensure that the responder actually holds the data.

The router 320 may forward back one or more messages created by using function SEND(name, location, PO, emptyfile) back to the mobile node 310, which generated the GET request in the PO mode. If multiple responses are received from different nodes (but with different locations) such as the case with locations 330 and 340, the multiple responses may be sent back to the router 320. The router 320 may then determine which network location to retrieve the content from. For example, shown as step 4 in FIG. 3, the router 320 determines that the network location 340 is the better retrieval source, and thus sends another interest packet to the network location 340. Shown as step 5 in FIG. 3, the network location 340 sends back a response containing the requested content. Shown as step 6 in FIG. 3, only one response from a given location needs to be forwarded back to the requester (i.e., mobile node 310). Meanwhile, the router 320 may also use its received responses to populate its FIB.

When operating in the PO mode 300, a content request comprising an interest packet may not necessarily be consumed or removed when the router 320 receives a response from an end point. For example, as the router 320 may receive multiple responses from multiple locations in the step 3, the interest packet (or the request in general) may be kept open until it times out, even though it has returned some responses. Keeping a state of the interest packet open may allow the router to continue receiving different potential locations holding the content 302.

In an embodiment, a PO mode may test a path between a node and various copies of the content and may return a list of known location of the content. Note that the list of known locations may not be exhaustive, as there might be contents that are not reached by the GET(.) message. Nevertheless, if there is a copy of the content in a local network domain and the network domain is able to properly route, then the GET(.,PO) may return at least one response.

In another embodiment, a PO mode may be used to test a specific location, e.g., by specifying this location in GET(name, location, PO) parameters. The network may route the interest packet to the specified location, and may return a yes/no answer as to whether the requested content is indeed at this location. This may achieve a testing feature similar to Ping in IP networks.

In an embodiment, a listed location only (LLO) mode may be used to request content from a specific location instead of from multiple potential locations. In this case, if the network is unable to reach the listed location, the request may be dropped. This may be used again for debugging purposes, e.g., by testing a specific route to a specified location. In this case, the response may contain the actual data, and the request/response exchange may consume network resources.

A combination of PO and LLO modes may allow a network to first gather the potential content locations, and then decide which location to use. Upon learning several content-holding locations, a network operator may then optimize, based upon its own incentive, which location to deliver the content.

The LLO mode may be specified by appending some attributes to a content request, such as an LLO attribute in a GET message, to force routing of the request to one of the specified locations in the location list. In addition, a probe (P) attribute may also be inserted to fetch only the locations that could answer to the request for a specific name, but may not return the actual data. The LLO attribute may be similar to an "origin only" attribute in conventional CCN, with the caveat that it may be any location specified by the requester, instead of just being the original content location (e.g., publisher server) as in conventional CCN. These primitives may be necessary in order to offer a smooth performance in many scenarios.

Figure 4:
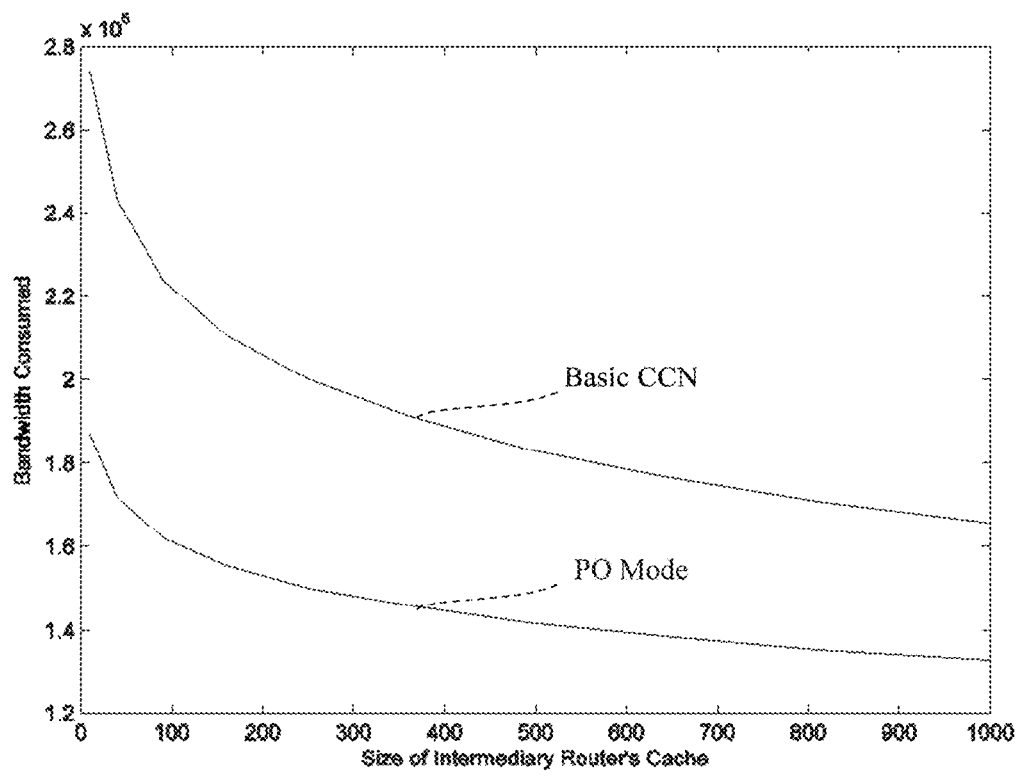
FIG. 4 depicts a difference in consumed bandwidth for various cache sizes at an intermediate router.
Figure 5:
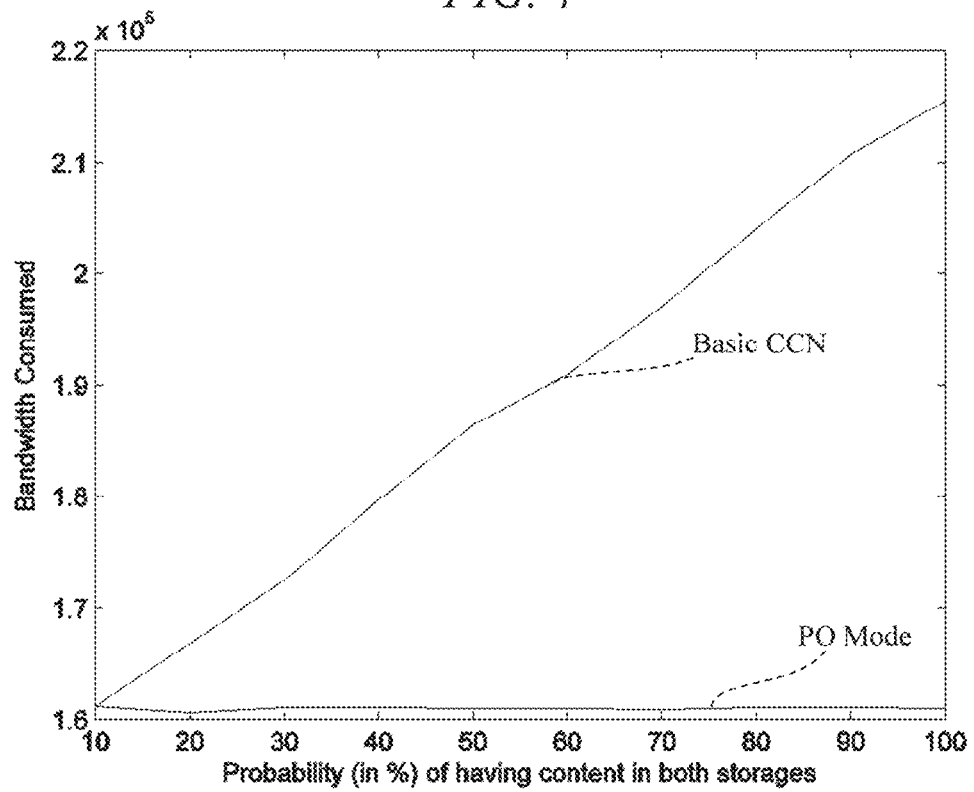
FIG. 5 depicts bandwidth saving of probing against the probability that a content is duplicated in multiple network locations.

To demonstrate benefits of the disclosed embodiments, the PO mode 300 was evaluated via simulation as shown in FIG. 4 and FIG. 5. The PO mode 300 instead of a location hint mode was used, as the location hint mode may need to make assumptions such as temporal self-correlation of traffic from a user, the spatial correlation of the requests within a given network, the hand-off patterns between two networks, the likelihood of caching in each network, the round-trip time to a cache within the previous network, and the previous access point versus the original server and the new access point. In many scenarios, the ability to locate the content by the help of a mobile node may be useful. For example, a user leaving a corporate network or a home network to join a wide area network (WAN) may lose connection to a local copy, and that the WAN may not be aware of all the files contained within such home or corporate network. In such scenarios, assisting the network with locating a content or file may bring a significant benefit.

In the PO mode 300, it may be observed that, if a regular interest is sent at the intermediate router 320, and both network locations 330 and 340 possess the requested content, then both network locations 330 and 340 may respond with the content. According to CCN specification, the intermediate router 320 may forward one data object and drop the other. The transfer of one of the copies from one of the network locations 330 and 340 to the intermediate router 320 may thus end up wasted.

The gain of having a PO mode may be quantified, which may return the location of the copies in the cache. If both network locations 330 and 340 have the data, then one cache may be selected and one copy may be fetched (note that an alternative strategy may be to fetch multiple segments from the multiple copies, e.g., using network coding). Thus, in the case of the PO mode 300, only two data transfers need to occur with the probe mode versus three with regular CCN. As data size is assumed to be much larger than interest size, the regular CCN strategy results in three data transfers for one interest from the end user, as opposed to two for the PO mode 300.

The simulation results in FIG. 4 and FIG. 5 further assume that contents or files are requested by a user according to a Zipf distribution for a population of 100,000 files with parameter $\alpha=1$. The mobile node 310 generates 100,000 requests and computes the amount of data transferred under a CCN strategy, which check if the request is available in the router 320, and if not, forwards the interest to both network locations 330 and 340. If both network locations 330 and 340 have the content (which happens with probability p), both network locations 330 and 340 respond with the content. It is assumed that at least one location has the content and may respond. When the intermediate router 320 receives a piece of content, the router 320 keeps it in its cache according to a least recently used (LRU) replacement policy.

FIG. 4 depicts a difference in consumed bandwidth for various cache sizes at the intermediate router 320 (with LRU policy, p=1 and $\alpha=1$). The larger the cache, the less bandwidth is consumed as expected. The PO mode 300 may keep a consumed bandwidth relatively constant. Using the basic CCN mode (in which both network locations 330 and 340 send back content to the router 320), as the duplicated interests find copies of the requested pieces of content with higher probability, the consumed (and wasted) bandwidth increases using the basic CCN mode.

FIG. 5 depicts bandwidth saving of probing against the probability that the content is duplicated in both the network locations 330 and 340 (with cache size at the intermediate router 320 set to 100 and $\alpha=1$). The lower this probability, the less saving, as if there is only one copy, the interest to the second cache just gets unsatisfied. The PO mode 300 may keep the bandwidth consumed relatively constant. Using the basic CCN mode, as the duplicated interests find copies of the requested pieces of content with higher probability, the consumed (and wasted) bandwidth increases. Comparing the basic CCN mode and the disclosed PO mode, one can easily notice the saving in bandwidth by probing first, when multiple copies are available from locations 330 and 340. Thus, this disclosure demonstrates that locating content before initiating a data transfer may reduce the bandwidth usage, e.g., in a simple network topology.

Figure 6:
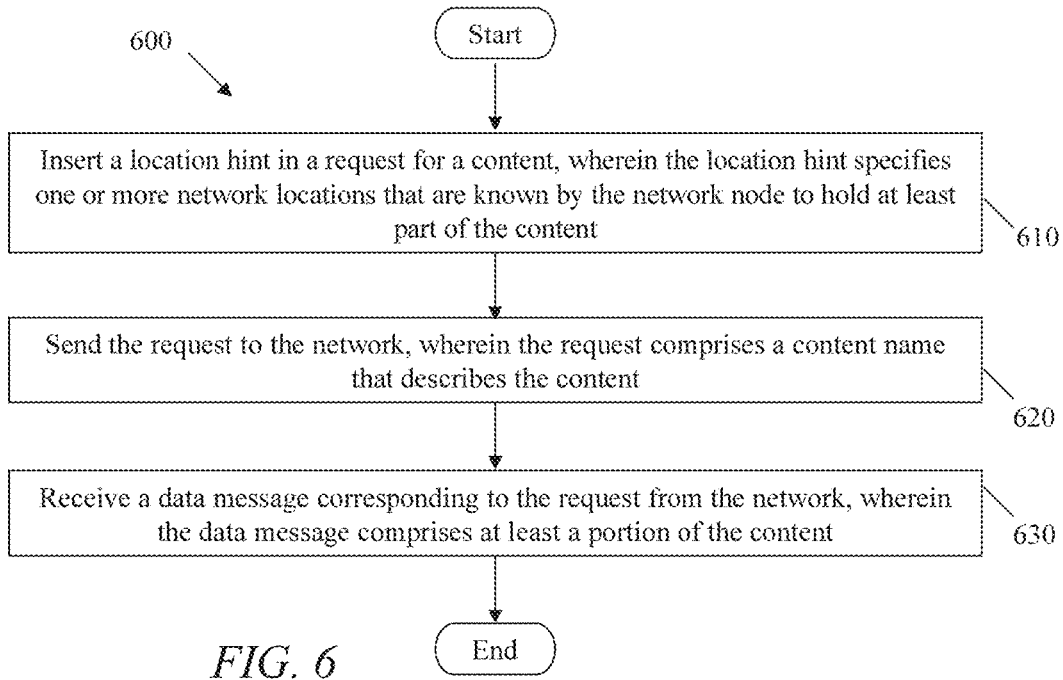
FIG. 6 is a flowchart of an embodiment of a content retrieving method.

FIG. 6 is a flowchart of an embodiment of a content retrieving method 600, which may be implemented by a network node coupled to a network. The network node may be a user end device, an access point, or an intermediate node (e.g., the client 112, the mobile node 202 or 310, the router 226, 234, or 320). The method 600 starts in step 610, in which the network node may insert a location hint in a request for a content, wherein the location hint specifies one or more network locations that are known by the network node to hold at least part of the content. In step 620, the method 600 may send the request to the network, wherein the request comprises a content name that describes the content. In step 630, the method 600 may receive a data message corresponding to the request from the network, wherein the data message comprises at least a portion of the content.

It should be understood that the methods 600 as illustrated by FIG. 6 may include just a portion of necessary steps in serving a content to a user end device, thus other steps may also be performed by the network node as appropriate. For example, if the network node implementing the method 600 is a mobile node, the method 600 may further include steps to generate the request. Otherwise, if the network node implementing the method 600 is an access point connected to a mobile node, the method 600 may further include steps to receive the request from the mobile node before inserting the location hint. One of ordinary skill in the art will recognize, from disclosed embodiments, additional details that can be incorporated into the method 600.

Figure 7:
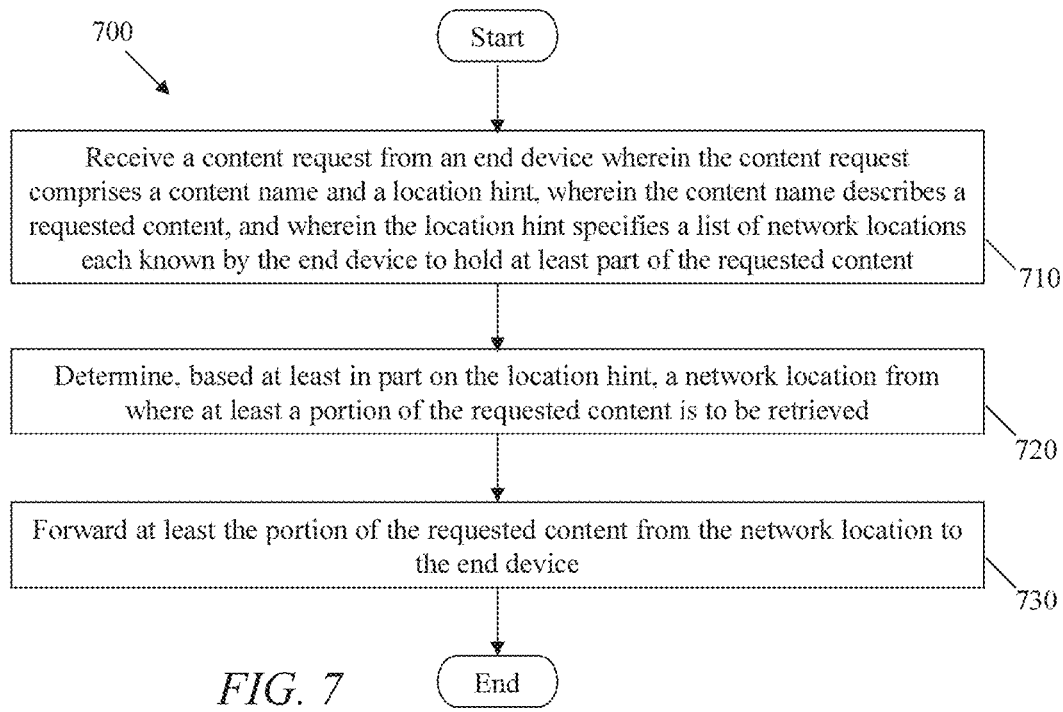
FIG. 7 is a flowchart of an embodiment of a content routing method.

FIG. 7 is a flowchart of an embodiment of a content routing method 700, which may be implemented by a network router (e.g., the router 226, 234, or 320). The method 700 starts in step 710, in which the network router may receive a content request from an end device (e.g., the mobile node 202 or 310), wherein the content request comprises a content name and a location hint, wherein the content name describes a requested content, and wherein the location hint specifies a list of network locations each known by the end device to hold at least part of the requested content. In step 720, the method 700 may determine, based at least in part on the location hint, a network location from where at least a portion of the requested content is to be retrieved. In step 730, the method 700 may forward at least the portion of the requested content from the network location to the end device.

Similar to methods 600, method 700 as illustrated by FIG. 7 may include other steps or may be modified as appropriate for various embodiments disclosed herein. One of ordinary skill in the art will recognize, from disclosed embodiments, additional details that can be incorporated into the method 600.

In one aspect of this disclosure, a location mechanism on a network layer may enable an end user or host to know the location of a content or to check if the content is hosted by a given server. This mechanism may allow a network to test a path between the end user and a content copy without actually downloading the content. In another aspect, the end user may provide the network with content location hints or information if the location of a content has been known by the end user. For example, after switching from a previous AP to a new AP, a mobile device may specify where it was previously downloading a content. The content location hint provided by the mobile device may help the new AP to perform content location resolution.

Thus, one of ordinary skill will recognize that disclosed features include a mechanism to assist a network node in locating named content in an ICN during handover of a mobile device, an identifier of possible locations for content in a request message from a mobile device for content in an ICN, and a probe an ICN to determine whether a link is active.

Figure 8:
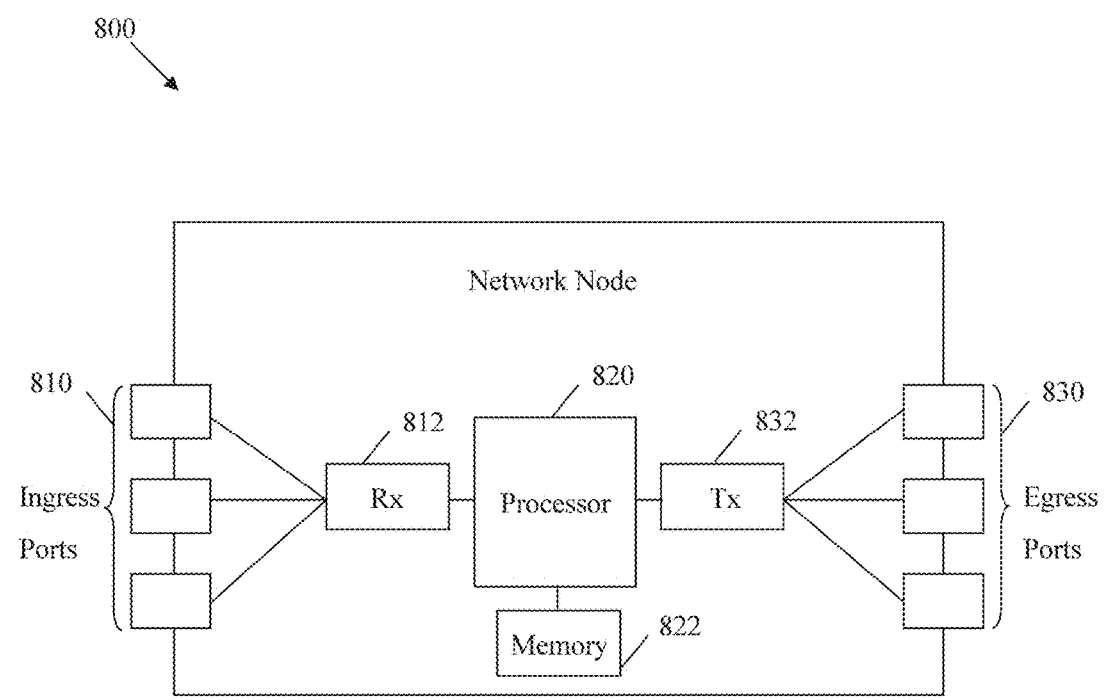
FIG. 8 is a diagram of an embodiment of a network node.

FIG. 8 is a diagram of an embodiment of a network device or node 800, which may be any device configured to transport packets through a network. For instance, the network node 800 may correspond to any of the mobile nodes 202 and 310, the routers 226, 234, and 320, the PS 204, etc.

The network node 800 may comprise one or more ingress ports 810 coupled to a receiver 812 (Rx), which may be configured for receiving packets or frames, objects, options, and/or type length values (TLVs) from other network components.

The network node 800 may comprise a logic unit or processor 820 that is in communication with the receiver 812 and a transmitter (Tx) 832. Although illustrated as a single processor, the processor 820 is not so limited and may comprise multiple processors. The processor 820 may be implemented as one or more central processor unit (CPU) chips, cores (e.g., a multi-core processor), field-programmable gate arrays (FPGAs), application specific integrated circuits (ASICs), and/or digital signal processors (DSPs). The processor 820 may be implemented using hardware or a combination of hardware and software. The processor 820 may be configured to implement any of the functional modules or units described herein.

The network node 800 may further comprise a memory 822, which may be a memory configured to store a routing table such as an FIB (e.g., the FIB 228 or 238). The network node 800 may also comprise one or more egress ports 830 coupled to a transmitter 832, which may be configured for transmitting packets or frames, objects, options, and/or TLVs to other network components. Note that, in practice, there may be bidirectional traffic processed by the network node 800, thus some ports may both receive and transmit packets. In this sense, the ingress ports 810 and the egress ports 830 may be co-located or may be considered different functionalities of the same ports that are coupled to transceivers (Rx/Tx). The processor 820, the memory 822, the receiver 812, and the transmitter 832 may also be configured to implement or support any of the schemes and methods described above, such as the PO mode 300, method 600, and the method 700.

It is understood that by programming and/or loading executable instructions onto the network node 800, at least one of the processor 820 and the memory 822 are changed, transforming the network node 800 in part into a particular machine or apparatus (e.g. a network node having the functionality taught by the present disclosure). The executable instructions may be stored on the memory 822 and loaded into the processor 820 for execution. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an ASIC, because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner, as a machine controlled by a new ASIC is a particular machine or apparatus, likewise a computer that has been programmed and/or loaded with executable instructions may be viewed as a particular machine or apparatus.

Any processing of the present disclosure may be implemented by causing a processor (e.g., a general purpose CPU) to execute a computer program. In this case, a computer program product can be provided to a computer or a network device using any type of non-transitory computer readable media. The computer program product may be stored in a non-transitory computer readable medium in the computer or the network device. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), compact disc read-only memory (CD-ROM), compact disc recordable (CD-R), compact disc rewritable (CD-R/W), digital versatile disc (DVD), Blu-ray (registered trademark) disc (BD), and semiconductor memories (such as mask ROM, programmable ROM (PROM), erasable PROM), flash ROM, and RAM). The computer program product may also be provided to a computer or a network device using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations may be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. The use of the term "about" means+/−10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having may be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. A method implemented by a network node coupled to a content centric networking (CCN)-based network, the method comprising:
receiving a first portion of a content from a first location in the CCN-based network via a first access point (AP);
switching from the first AP to a second AP;
inserting a location hint in an interest packet for a content located in the CCN-based network, wherein the location hint is initially generated by the network node and specifies one or more network locations in the CCN-based network that are known by the network node to hold at least a second portion of the content based on a prior retrieval of the second portion of the content by the network node via a different AP than the second AP, the second portion of the content comprises the first portion of the content, and the one or more network locations comprises the first location, wherein the interest packet comprises a content name that describes the content, and wherein the content name is routable within the CCN-based network;
sending the interest packet to the CCN-based network; and
receiving a data message corresponding to the interest packet from the CCN-based network, wherein the data message comprises a third portion of the content.

2. The method of claim 1, wherein the interest packet further comprises a probe flag inserted to test the one or more network locations, wherein the interest packet is sent to the one or more network locations in the CCN-based network, wherein the method further comprises receiving one or more responses from the one or more network locations prior to receiving the data message, and wherein each of the one or more responses specifies whether a corresponding network location holds the content at a time the interest packet was sent.

3. The method of claim 2, wherein a retrieval source of the third portion of the content is determined based on the location hint and the probe flag, and wherein each of the one or more responses is received prior to the data message and comprises an empty data message with no portion of the content.

4. The method of claim 3, further comprising keeping a state of the interest packet open until the data message is received, wherein receiving the data message occurs before a time out and when the state of the interest packet is kept open.

5. The method of claim 1, wherein the network node is an access point serving as an interface between the CCN-based network and a user end device, and the method further comprising, prior to inserting the location hint, receiving the interest packet from the user end device.

6. The method of claim 1, wherein the interest packet further comprises a packet header, wherein the location hint is inserted in the packet header as a parameter of a GET primitive, and wherein the data message comprises data packets formed using a SEND primitive and containing the third portion of the content.

7. The method of claim 1, wherein the interest packet further comprises a listed location only (LLO) attribute which dictates that the interest packet contains only one specific network location and targets only the specific network location.

8. A method implemented by a network node coupled to a network, the method comprising:
receiving a first portion of a content from a first location in the network via a first access point (AP);
switching from the first AP to a second AP;
inserting a location hint in a request for the content, wherein the location hint is initially generated by the network node and specifies one or more network locations that are known by the network node to hold at least a second portion of the content based on a prior retrieval of the second portion of the content by the network node via a previous AP different from the second AP, wherein the second portion of the content comprises the first portion of the content, and the one or more network locations comprises the first location;
sending the request to the network, wherein the request comprises a content name that describes the content; and
receiving a data message corresponding to the request from the network, wherein the data message comprises a third portion of the content, wherein the network node is a mobile node coupled to the network via the second AP, wherein the second AP is a wireless AP, wherein the mobile node has migrated from the previous AP to the wireless AP.

9. An apparatus comprising:
a transmitter;
a receiver;
a memory configured to store executable instructions; and
a processor configured to execute the executable instructions to:
insert a probe flag in an interest for a content located in a content centric networking (CCN)-based network, wherein the interest comprises a content name that describes the content and is routable within the CCN-based network, and wherein the probe flag is inserted to test one or more network locations including a first location within the CCN-based network that are known to hold at least a portion of the content based on a prior retrieval of the portion of the content from the first location in the CCN based network by the apparatus via a previous access point (AP) different from a current AP;
test liveliness of a path involving one or more links between the one or more network locations;
transmit the interest to a network node within the CCN-based network; and
receive a data message corresponding to the interest from the network node.

10. The apparatus of claim 9, wherein the processor further executes the executable instructions to:
transmit the interest via the transmitter to each of the one or more network locations including the network node; and
receive via the receiver one or more responses from the one or more network locations, and wherein each of the one or more responses answers the probe flag by specifying whether a corresponding network location holds the content at a time when the interest was sent.

11. The apparatus of claim 10, wherein each of the one or more responses is received prior to the data message and contains no portion of the content, and wherein the processor is further configured to keep a state of the interest open until receiving the data message or until a time out set by the apparatus.

12. The apparatus of claim 9, wherein the processor further executes the executable instructions to transmit via the transmitter the interest in a listed location only (LLO) mode in which the interest contains only a location of the network node and targets only the network node, and wherein the apparatus is co-located with the network node in the CCN-based network.

13. The apparatus of claim 9, wherein the interest comprises a packet header, wherein a location hint is inserted in the packet header as a parameter of a GET primitive, and wherein the data message comprises data packets formed using a SEND primitive and containing a second portion of the content.

14. A method implemented by a network router configured to operate in a content centric networking (CCN)-based network, the method comprising:
receiving a content request from an end device, wherein the content request comprises a content name and a location hint initially generated by the end device, wherein the content name describes a content located in the CCN-based network and is routable within the CCN-based network, and wherein the location hint specifies a list of network locations including a first location in the CCN-based network, the list of network locations each known by the end device to hold at least a first portion of the content based on a prior retrieval of the first portion of the content from the first location in the CCN-based network by the end device via a previous access point (AP) different from a current AP;
determining, based at least in part on the location hint, a network location within the CCN-based network from where a second portion of the content is to be retrieved; and
forwarding at least the second portion of the content from the network location to the end device.

15. The method of claim 14, wherein the content request further comprises a probe flag intended to test availability of the content at potential network locations within the CCN-based network, and wherein determining the network location is further based on the probe flag.

16. The method of claim 15, further comprising receiving a response from each of the potential network locations including one or more local caches and an original server of the content, and wherein each response contains an empty data message and specifies whether a potential network location actually holds the content at a time when the content request was sent.

17. The method of claim 16, further comprising:
storing the content name and each of the potential locations that holds the content as specified by each response;
receiving a second request for the content name; and
resolving the content name to the potential locations.

18. The method of claim 14, further comprising:
receiving different segments of the content from at least two of the network locations; and
combining the different segments for forwarding to the end device.

19. The method of claim 14, wherein the network router is an intermediate router between the end device and the list of network locations, and wherein the end device is a mobile node capable of accessing the network routers via different network routers.

20. The method of claim 14, further comprising sending the content request in a listed location only (LLO) mode in which the content request targets only the network location specified by the network router, wherein the network router is co-located with a node at the network location in the CCN-based network.

* * * * *

UNITED STATES PATENT AND TRADEMARK OFFICE
CERTIFICATE OF CORRECTION

PATENT NO. : 9,967,780 B2
APPLICATION NO. : 14/147346
DATED : May 8, 2018
INVENTOR(S) : Cedric Westphal It is certified that error appears in the above-identified patent and that said Letters Patent is hereby corrected as shown below:

In the Claims

Column 17, Lines 53-67, through Column 18, Lines 1-9, Claim 9 should read:
9. An apparatus comprising:
a transmitter;
a receiver;
a memory configured to store executable instructions; and
a processor configured to execute the executable instructions to:
    insert a probe flag in an interest for a content located in a content centric networking (CCN)-based network, wherein the interest comprises a content name that describes the content and is routable within the CCN-based network, and wherein the probe flag is inserted to test one or more network locations including a first location within the CCN-based network that are known to hold at least a portion of the content based on a prior retrieval of the portion of the content from the first location in the CCN-based network by the apparatus via a previous access point (AP) different from a current AP;
    test liveliness of a path involving one or more links between the one or more network locations;
    transmit the interest to a network node within the CCN-based network; and
    receive a data message corresponding to the interest from the network node.

Signed and Sealed this
Third Day of July, 2018

Andrei Iancu
*Director of the United States Patent and Trademark Office*